Patented Dec. 24, 1940

2,226,528

UNITED STATES PATENT OFFICE 2,226,528

ALKALOID OF SPECIES OF ERYTHRINA AND PROCESS FOR PRODUCTION

Karl Folkers, Plainfield, N. J., assignor to Merck & Co. Inc., Rahway, N. J., a corporation of New Jersey No Drawing. Application July 27, 1938, Serial No. 221,569

8 Claims. (Cl. 260—236)

This invention relates to substances having a physiological action similar to that of the drug curare, and to processes for their production from species of the genus Erythrina.

Plants of the species of the genus Erythrina (fam. Leguminosae, sub. fam. Papilionaceae) are distributed throughout the world, but are found in greatest profusion in the tropical and subtropical regions. It had been known that some species of Erythrina contained alkaloids, but the only alkaloid which has ever been isolated in pure form and chemically identified is the alkaloid, hypaphorine. However, this is relatively physiologically inactive, a property common to several alkaloid betaines. Other than this, it has only been known that alkaloids were present in a few Erythrina species, and this was known generally because of the toxic effects exhibited by the species; nothing has been known regarding the nature of the alkaloids.

There is a definite need in the therapeutic field for drugs which may be used for certain neuromuscular diseases. Curare, the arrow poison, is a complex drug obtained from many plants (species of Strychnos, menispermaceous plants, etc.). Since curare is relatively difficultly obtainable, and expensive, and since its action, potency, and toxicity vary according to the plants used as a source, and their geographical origin, it is a very difficult drug to use.

I have found that species of Erythrina contain an alkaloidal fraction which acts selectively to paralyze the motor nerve endings of striated muscle, or exhibits a typical curarelike action; the new substances may be substituted for curare.

In application Serial No. 180,143, filed December 16, 1937, I have disclosed the new substances which I have found to exhibit a physiological action similar to curare, and have described processes for their production from certain species of Erythrina. The present application is a continuation-in-part of that earlier application, and discloses further specific members of the Erythrina family from which the active substances may be obtained.

Among the species which I have found to contain the active alkaloidal fraction may be mentioned the following: *E. americana, E. herbacea, E. flabelliformis, E. neglecta, E. berteroana, E. sandwicensis, E. crista-galli, E. subumbrans, E. fusca, E. caffra, E. vespertilio, E. abyssinica, E. costaricensis, E. poeppigiana, E. variegata, E. hondurensis, E. folkersii, E. velutina, E. falcata, E. glauca, E.* species (Haight 9170), *E.* species (Gomez Parente 9169), *E. rubrinervia, E. dominguezii, E. senegalensis, E. acanthocarpa, E. edulis, E.* species (Buitenzorg 9146), *E.* species, (Buitenzorg 9149), *E.* species (Walmsley 9211), *E.* species (Niehaus 9200), *E. griesebachii, E. poianthes, E. arborescens.* The active alkaloidal fraction may also be obtained from: *E. goldmanii, E. umbrosa, E. lanceolata, E. breviflora, E. cochleata, E. lanata, E. panamenis, E. corallodendrum, E. ulei, E. mulungu, E. insularis, E. zeyheri, E. coralloides, E. occidentalis, E. glabrescens, E. resupenata, E. himeana.*

The physiologically active alkaloidal fraction is found in various parts of plants of the species mentioned, such as the bark of stems or roots, seeds, flowers, etc. I have found that the alkaloidal fractions obtained from all of the species exhibit similar physiological action. However, the physical and chemical properties of the individual alkaloids differ somewhat, and for this reason I have developed special methods of separation and purification for the individual alkaloids which may be suitably modified or adapted to the particular case; all such modifications and adaptations will be more completely described in further continuation applications.

In many cases, the alkaloid hypaphorine occurs with the new physiologically active alkaloidal fraction.

According to my invention the hypaphorine, if present, may be first separated from the crude material. This may be accomplished by separating out any fatty materials, which may be present, acidulating the "clarified" material and crystallizing out the corresponding hypaphorine salt. The material remaining after the hypaphorine separation may then be slightly alkalinized and further processed for the production of the physiologically active alkaloidal fraction.

According to the preferred method, however, the selected starting material may be freed from any fatty materials inherent therein, and the residue may then be made slightly alkaline, after which it is extracted with an immiscible solvent for the direct production of the physiologically active alkaloidal fraction.

For the extraction of the physiologically active alkaloidal fraction from the alkaline solution, any immiscible organic solvent may be used. Chloroform, carbon tetrachloride, benzene, toluene, etc., are entirely suitable and typical of other equivalent solvents which may be employed.

The solvents to be employed for removing the fatty substances will depend upon the selected starting material. For example, when seeds are used, the fatty substances inherent therein may be removed by extraction with petroleum ether, carbon tetrachloride, diethyl ether, chloroform, etc. Any traces of the active alkaloidal fraction removed with the fatty substances may be recovered by extraction with dilute aqueous acid.

Also, in treating the seeds, I have found that the alkaloidal fraction may be obtained by treating the ground seeds or defatted ground seeds with water. The treated material is concentrated to crystallize hypaphorine, and the residue is then worked up for the production of the active principles.

In treating the bark of roots, stems, or flowers, the resinous substances may be separated out together with the active alkaloidal fraction, by extracting with methyl alcohol, ethyl alcohol, etc., and the resinous substances precipitated by treatment with water. Acidulated water may be used for the separation of the alkaloidal fraction and the resinous substances, and the resinous substances may be then removed by concentration, and filtration.

Other modifications of the process may also be practiced. For example, a slightly alkaline solution of the bark or seeds may be extracted directly with an organic immiscible solvent, and the physiologically active alkaloidal fraction may be then separated from any fatty or resinous material extracted with it.

In the following specific examples, I am illustrating the processes of my invention as applied to certain species of Erythrina. It will be understood that the methods are generally applicable to all species of this family, as hereinbefore indicated and enumerated, and that the procedures exemplified may be appropriately modified as may be deemed expedient and as taught herein, when applied to different species, without departing from the spirit of my invention and the scope of the appended claims.

Example I

Fifty grams of seed, ground to 40 mesh, of *Erythrina americana* Mill. are extracted for three hours with a fat solvent, i. e., petroleum ether. The solvent is distilled, finally in vacuo, and the fatty fraction residue which remains amounts to 6.1 g. or 12.2%. Traces of alkaloids may be recovered from this fatty fraction by extraction with dilute acid, i. e., 1% hydrochloric acid solution, with or without the aid of solvent.

The seed powder is next extracted with ordinary ethanol (or methanol) for at least ten hours, or until the proper amount of extractives have been removed. The alcohol extract is distilled to a low volume, and finally all the alcohol is removed at 10-20 mm. at 40-50°. The residue in this case weighs 6.4 g. or 12.8%. (The weight of this residue for various seeds may vary from 10 to 20%. After the proper time of alcohol extraction is predetermined, the alcohol extract may be distilled to a low volume, and then treated with water, etc. The last of the alcohol would be removed during the concentration in vacuo.) The residue is dissolved in 60 ml. of water, treated with 1 ml. of conc. hydrochloric acid, and is then clarified.

The clarification, or removal of the last amounts of the fatty fraction, may be accomplished best by the following solvents, chloroform, petroleum ether, diethyl ether. Continuous or separate extractions are used depending upon the quantity of seeds in operation. The preferred procedure consists of first extracting with petroleum ether, and then with chloroform. These solvents must be properly handled in order to avoid bad emulsions. Traces of alkaloids removed (in emulsified water droplets) may be recovered by extraction with dilute acid, etc.

The clarified solution is then concentrated in vacuo (nitrogen capillary if necessary) at the water pump and at a temperature of 25-30°. Hypaphorine hydrochloride generally crystallizes during this concentration, which is stopped at a volume of about 6 ml. The yield for this particular sample was 773 mg. or 1.5%. The residual hypaphorine salt in the filtrate may be recovered by suitable treatment.

The filtrate, now largely free of hypaphorine, is diluted to 60 ml. with water and made weakly alkaline, for example, by using sodium bicarbonate solution. The solution is then exhaustively extracted by an immiscible solvent, i. e., chloroform, and upon subsequent distillation of the solvent, finally in vacuo, the crude active alkaloidal fraction is obtained. The precaution of vacuum concentration at 30° with a nitrogen capillary may be advisable.

Example II

Thirty grams of *Erythrina costaricensis* Micheli, ground to 40 mesh, are extracted for three hours in a Soxhlet with petroleum ether. The fatty residue amounts to 4.5 g. or 15%. The powder is then extracted for 22 hours with methanol, and the alcohol is removed as in Example I. The alcohol extractive amounts to 5.3 g. or 17.7%. These are dissolved in 30 ml. of water, treated with 0.6 ml. of conc. hydrochloric acid, and clarified, first with petroleum ether, and then with chloroform. The aqueous solution is then made weakly alkaline, for example, by sodium bicarbonate solution, and then is exhaustively extracted with an immiscible solvent, i. e., chloroform. Upon removal of the solvent by proper distillation, the crude active alkaloidal fraction remains. The hypaphorine may then be obtained by acidifying the aqueous solutions, for example, with hydrochloric acid, and concentrating at 10-20 mm. and at a temperature of 25-30°, etc.

Example III

About 300 g. of dried flowers from *Erythrina neglecta* Kruk. and Mold. (40 mesh) are extracted in a Soxhlet extractor with 1200 ml. of 95% ethanol for about 14 hours. The extract is then filtered, diluted with 250 ml. of water, acidulated with 2 ml. of concentrated hydrochloric acid and concentrated in vacuo at 25-30° to a volume of about 200 ml. This concentrate is diluted again with water, filtered and concentrated in vacuo at 25-30° to 50 ml. After filtering again from flocculent substances, the solution is made weakly alkaline, i. e., by treatment with a solution of sodium bicarbonate, and extracted several times with chloroform. The chloroform solution is distilled in vacuo and the crude active alkaloid residue pumped out at 30°-35° C. and 1 mm. pressure.

Example IV

About 100 g. of seed powder of *Erythrina neglecta* Kruk. and Mold. (or of *Erythrina sandwicensis* Deg.) are extracted with petroleum ether to remove the fatty fraction, and are then treated with 300 ml. of water. The mixture is stirred, or shaken, and may be warmed by a steam bath. The mixture is filtered, best by porous cloth bags, and the water treatment is repeated until all the alkaloidal fraction is removed. The combined filtrates are concentrated in vacuo at 25–30°, and are made weakly alkaline, for example, by sodium bicarbonate solution. The solution is then exhaustively extracted with an immiscible solvent such as chloroform, and on distillation of the solvent, the crude active alkaloid remains. The hypaphorine remains in the aqueous solution, and may be recovered.

Example V

The process of Example IV is followed, except that an alcohol-water mixture is used to extract the seed powder, which has, or has not previously been freed of the fatty fraction. It may be somewhat easier to filter the alcohol-water mixture extracts than the pure water extracts. On 169 g. of seed powder of *Erythrina neglecta* Kruk. and Mold., the water treatment is made first with 600 ml. of 50% aqueous alcohol, and second with 400 ml. of solvent. After this second extraction, Mayer's reagent gave no precipitate, but Scheibler's reagent did give a precipitate. Three more extractions are made, each with 400 ml. of solution. All filtrates are combined, concentrated in vacuo at 20–25°, and then clarified with charcoal. The solution is made weakly alkaline, i. e., with a solution of sodium bicarbonate and is then exhaustively extracted with an immiscible solvent, such as chloroform. On distillation of the solvent, the crude active alkaloid fraction residue is obtained.

Example VI

About 149 g. of seed powder of *Erythrina neglecta* Kruk. and Mold. is extracted in a continuous apparatus for about 26 hours with methanol. On distillation of the solvent, there remains about 21.6% of extractives. The residue is dissolved in water, treated with 3 ml. of conc. hydrochloric acid, and diluted to 150 ml. volume. The aqueous solution is freed of that portion of the fatty fraction soluble in methanol by extraction with petroleum ether. (Subsequent clarification with chloroform is of advantage.) The aqueous solution is then made weakly alkaline with a solution of sodium bicarbonate and exhaustively extracted with chloroform. On distillation of the solvent, the crude active alkaloidal fraction remains. The hypaphorine may be recovered.

Example VII

About 75 g. of seed powder of *Erythrina Americana* Mill. are extracted with methanol as in Example VI. The residue left after distillation of the methanol amounts to about 20.5 g. or 27.3%. This residue is dissolved in 75 ml. of water, treated with 1.5 ml. of conc. hydrochloric acid and freed of the fatty components by extraction with diethyl ether. The aqueous solution is concentrated at 20–25° in vacuo to about 20 ml., and after standing at 10°, the hypaphorine hydrochloride is filtered. The filtrate is diluted, made weakly alkaline with a sodium bicarbonate solution, and extracted with chloroform. On distillation of the solvent, the crude active alkaloidal fraction remains.

Example VIII

Extractions of an active alkaloidal fraction from seed powder (from several barks also) is carried out similarly for the following species of Erythrina. The process of Example II is preferable, generally.

E. herbacea
E. flabelliformis
E. berteroana
E. crista-galli
E. subumbrans
E. fusca
E. poeppigiana
E. variegata
E. hondurensis
E. folkersii
E. caffra
E. vespertilio
E. abyssinica
E. velutina
E. poianthes
E. cubensis
E. pallida
E. aurantiaca
E. parcelli E. falcata
E. glauca
E. rubrinervia
E. dominguezii
E. senegalensis
E. acanthocarpa
E. edulis
E. griesebachii
E. arborescens
E. species 9170
E. species 9169
E. species 9146
E. species 9149
E. species 9200
E. mysorensis
E. altissima
E. sigmoidea
E. suberosa
E. stricta

Example IX

About 600 g. of ground bark of *Erythrina velutina* Willd. (40 mesh) are exhaustively extracted for about 18 hours with methyl alcohol. The cold extract is filtered from precipitated resinous matter, and concentrated in vacuo to about 200 ml. About 2 ml. of concentrated hydrochloric acid are added, and the solution poured into 250 ml. of water. The mixture is allowed to stand in the refrigerator until the precipitated resins, etc., are completely solidified. The resins are removed by filtration, and the filtrate is concentrated in vacuo until all residual alcohol is removed. The concentrate is made slightly alkaline by treatment with sodium bicarbonate, and exhaustively extracted with chloroform. It is distilled in vacuo (nitrogen capillary) at 30° C. to leave the crude alkaloid.

I claim:

1. A process for the production of a physiologically active alkaloidal fraction from species of Erythrina comprising removing any fats present in parts of said species, extracting said parts with a substance selected from the group consisting of lower aliphatic alcohols, water, and aqueous lower aliphatic alcohols, concentrating the extract at about 40–50° C. and 10–20 mm. when lower aliphatic alcohols are used and at about 25–30° C. in vacuo when water or aqueous lower aliphatic alcohols are used, adding water to the concentrate when lower aliphatic alcohols are used, acidulating the aqueous mixture with hydrochloric acid at the ratio of about 2 ml. of concentrated hydrochloric acid to 100 gms. of Erythrina parts, clarifying the acidulated aqueous extract with petroleum ether and then with chloroform, making the clarified extract weakly alkaline, and exhaustively extracting with chloroform to obtain the physiologically active alkaloidal fraction.

2. A process for the production of a physiologically active alkaloidal fraction from species of Erythrina comprising removing any fats present in parts of said species, extracting said parts with a substance selected from the group consisting of lower aliphatic alcohols, water, and aqueous lower aliphatic alcohols, concentrating the extract at about 40–50° C. and 10–20 mm. when lower aliphatic alcohols are used and at about 25–30° C. in vacuo when water is used, adding water to the concentrate when lower aliphatic alcohols are used, acidulating the aqueous mixture with hydrochloric acid at the ratio of about 2 ml. of concentrated hydrochloric acid to 100 gms. of Erythrina parts, clarifying the acidulated aqueous extract with petroleum ether and then with chloroform, treating the clarified extract with sodium bicarbonate, and exhaustively extracting with chloroform to obtain the physiologically active alkaloidal fraction.

3. A process for the production of a physiologically active alkaloidal fraction from species of Erythrina comprising removing any fats present in parts of said species, extracting said parts with water, concentrating at about 25–30° C. in vacuo, acidulating the concentrate with hydrochloric acid at the ratio of about 2 ml. concentrated hydrochloric acid to 100 gms. of Erythrina parts, clarifying the acidulated aqueous extract with petroleum ether and then with chloroform, alkalinizing the clarified extract with sodium bicarbonate, and exhaustively extracting the alkalinized extract with chloroform to obtain the physiologically active alkaloidal fraction.

4. A process for the production of a physiologically active alkaloidal fraction from species of Erythrina comprising removing any fats present in parts of said species, extracting said parts with aqueous lower aliphatic alcohols, concentrating at about 25–30° C. in vacuo, acidulating the aqueous solution with hydrochloric acid at the ratio of about 2 ml. concentrated hydrochloric acid to 100 gms. of Erythrina parts, clarifying the acidulated aqueous extract with petroleum ether and then with chloroform, alkalinizing the clarified extract with sodium bicarbonate, and exhaustively extracting the alkalinized extract with chloroform to obtain the physiologically active alkaloidal fraction.

5. A process for the production of a physiologically active alkaloidal fraction from species of Erythrina comprising removing any fats present in parts of said species, extracting said parts with a lower aliphatic alcohol, concentrating the extract at about 40–50° C. and 10–20 mm., mixing the concentrate with water, acidulating the aqueous mixture with concentrated hydrochloric acid at the ratio of about 2 ml. concentrated hydrochloric acid to 100 gms. of Erythrina parts, clarifying the acidulated aqueous extract with petroleum ether and then with chloroform, alkalinizing the clarified extract with sodium bicarbonate, and exhaustively extracting the alkalinized extract with chloroform to obtain the physiologically active alkaloidal fraction.

6. A process for the production of a physiologically active alkaloidal fraction from seeds of Erythrina sandwicensis Deg. comprising removing the fats present in said seeds, extracting the fat-free seeds with water, concentrating at about 25–30° C. in vacuo, acidulating the concentrate with hydrochloric acid at the ratio of about 2 ml. of concentrated hydrochloric acid to 100 gms. of seeds, clarifying the acidulated extract with petroleum ether and then with chloroform, alkalinizing the clarified extract with sodium bicarbonate, and exhaustively extracting the alkalinized extract with chloroform to obtain the physiologically active alkaloidal fraction.

7. A process for the production of a physiologically active alkaloidal fraction from seeds of Erythrina neglecta Kruk. and Mold. comprising removing the fats present in said seeds, extracting the fat-free seeds with an aqueous lower aliphatic alcohol, concentrating at about 25–30° C. in vacuo, acidulating the concentrate with hydrochloric acid at the ratio of about 2 ml. of concentrated hydrochloric acid to 100 gms. of seeds, clarifying the acidulated extract with petroleum ether and then with chloroform, alkalinizing the clarified extract with sodium bicarbonate, and exhaustively extracting the alkalinized extract with chloroform to obtain the physiologically active alkaloidal fraction.

8. A process for the production of a physiologically active alkaloidal fraction from seeds of Erythrina costaricensis Micheli comprising removing the fats present in said seeds, extracting the fat-free seeds with a lower aliphatic alcohol, concentrating the extract at about 40–50° C. and 10–20 mm., mixing the concentrate with water, acidulating the aqueous mixture with concentrated hydrochloric acid at the ratio of about 2 ml. of concentrated hydrochloric acid to 100 gms. of Erythrina parts, clarifying the acidulated aqueous extract with petroleum ether and then with chloroform, alkalinizing the clarified extract with sodium bicarbonate, and exhaustively extracting the alkalinized extract with chloroform to obtain the physiologically active alkaloidal fraction.

KARL FOLKERS.